(12) United States Patent
Joshi et al.

(10) Patent No.: US 9,720,753 B2
(45) Date of Patent: Aug. 1, 2017

(54) CLOUDSEER: USING LOGS TO DETECT ERRORS IN THE CLOUD INFRASTRUCTURE

(71) Applicant: NEC Laboratories America, Inc., Princeton, NJ (US)

(72) Inventors: Pallavi Joshi, Plainsboro, NJ (US); Hui Zhang, Princeton Junction, NJ (US); Jianwu Xu, Lawrenceville, NJ (US); Xiao Yu, Jersey City, NJ (US); Guofei Jiang, Princeton, NJ (US)

(73) Assignee: NEC Corporation, Tokyo (JP)

( * ) Notice: Subject to any disclaimer, the term of this patent is extended or adjusted under 35 U.S.C. 154(b) by 67 days.

(21) Appl. No.: 14/957,566

(22) Filed: Dec. 2, 2015

(65) Prior Publication Data

US 2016/0179600 A1 Jun. 23, 2016

Related U.S. Application Data

(60) Provisional application No. 62/095,299, filed on Dec. 22, 2014.

(51) Int. Cl.
*G06F 11/07* (2006.01)
*H04L 12/24* (2006.01)

(52) U.S. Cl.
CPC ...... *G06F 11/0751* (2013.01); *G06F 11/0715* (2013.01); *H04L 41/00* (2013.01)

(58) Field of Classification Search
CPC ............. G06F 11/0766; G06F 11/0772; G06F 11/0784; G06F 11/14; G06F 11/2023; G06F 11/07; H04L 41/5038; H04L 41/0663; H04L 43/10; H04L 43/50; H04L 43/04

See application file for complete search history.

(56) References Cited

U.S. PATENT DOCUMENTS

| | | | | |
|---|---|---|---|---|
| 9,122,841 | B2 * | 9/2015 | Pavlov | G06F 21/00 |
| 9,378,079 | B2 * | 6/2016 | Ivanova | G06F 11/0751 |
| 2015/0142385 | A1 * | 5/2015 | Otsuka | G06F 11/0706 702/182 |
| 2016/0062815 | A1 * | 3/2016 | Ivanova | G06F 11/0751 714/26 |

OTHER PUBLICATIONS

Lou et al, Mining Invariants from Console Logs for System Problem Detection, USENIX Conference on USENIX Annual Technical Conference, Jun. 2010.

* cited by examiner

*Primary Examiner* — Nadeem Iqbal
(74) *Attorney, Agent, or Firm* — Joseph Kolodka

(57) ABSTRACT

Systems and methods are disclosed for detecting error in a cloud infrastructure by running a plurality of training tasks on the cloud infrastructure and generating training execution logs; generating a model miner with the training execution logs to represent one or more correct task executions in the cloud infrastructure; after training, running a plurality of tasks on the cloud infrastructure and capturing live execution logs; and from the live execution logs, if a current task deviates from the correct task execution, indicating an execution error for correction in real-time.

18 Claims, 4 Drawing Sheets

Task 1                                     Task 2

CLOUDSEER: USING LOGS TO DETECT ERRORS IN THE CLOUD INFRASTRUCTURE

This application claims priority to Provisional Application Ser. 62/095,299 filed 2014 Dec. 22, the content of which is incorporated by reference.

BACKGROUND

The present invention relates to Online Error Detection for the Cloud Infrastructure.

With the fast growth of the global cloud-computing market, a number of dedicated software services have emerged that manage various aspects (e.g., computing, storage, and networking) of the cloud. For instance, Amazon Elastic Compute Cloud (EC2) and Microsoft Azure are two widely used public cloud services that enable users to easily set up computing platforms in the cloud with multiple servers and configurable storage and networking (Infrastructure-as-a-service, IaaS). OpenStack is another popular platform providing IaaS for public and private clouds. OpenStack is open-source, and has been gaining popularity steadily in recent years.

Cloud services and platforms manage and provide convenient access to computing, storage, and networking resources in the cloud. For example, they have provision for tasks that let a user spawn virtual machines (VMs), stop VMs, delete VMs, etc. These tasks often involve coordination and communication between multiple processes (e.g., authentication, scheduler to assign VMs to machines, booting up VMs, etc.) in different machines. The complexity and non-determinism in tasks can many a time result in subtle errors and performance issues that can be hard to detect.

Conventional systems perform an offline analysis using log messages for different instances of a task. They assume that the log messages would have identifiers that would distinguish between different instances of a task. They group log messages based on those identifiers. Then they create models (vectors, automata, etc.) for all the groups, and find which of the models are anomalous.

SUMMARY

Systems and methods are disclosed for detecting error in a cloud infrastructure by running a plurality of training tasks on the cloud infrastructure and generating training execution logs; generating a model miner with the training execution logs to represent one or more correct task executions in the cloud infrastructure; after training, running a plurality of tasks on the cloud infrastructure and capturing live execution logs; and from the live execution logs, if a current task deviates from the correct task execution, indicating an execution error for correction in real-time.

Advantages of the system may include one or more of the following. The system provides higher quality and faster operation. The system, called CloudSeer, can detect subtle errors that do not have easily noticeable symptoms, e.g., performance degradation and failures without any crashes or error messages. It can not only detect errors but also provide execution context (e.g. how far along was the task that had the error in its execution, which were the other tasks executing concurrently, etc.) for the errors that can aid in fixing the errors. The system does not add any additional overhead to the execution of a cloud infrastructure task. It analyzes logs that are already generated by processes involved in the task. The system can detect anomalies/errors in an online manner, that is, we do not wait until we have all the log messages for a task. Rather, we can detect an error as the task is executing. The system detects such execution anomalies in cloud infrastructure in real-time in an automated manner. We leverage the information in execution logs to detect anomalies. Also, we do not assume that all log messages would have unique identifiers that would associate them with unique task instances. Unlike some of the previous work that requires instrumenting code (of the cloud infrastructure platform under consideration) to determine vector clocks and happens-before relation between different operations, the system does not need to instrument the code, and thus, the system does not add any extra overhead during execution of the cloud platform.

DESCRIPTION

Figure 1:
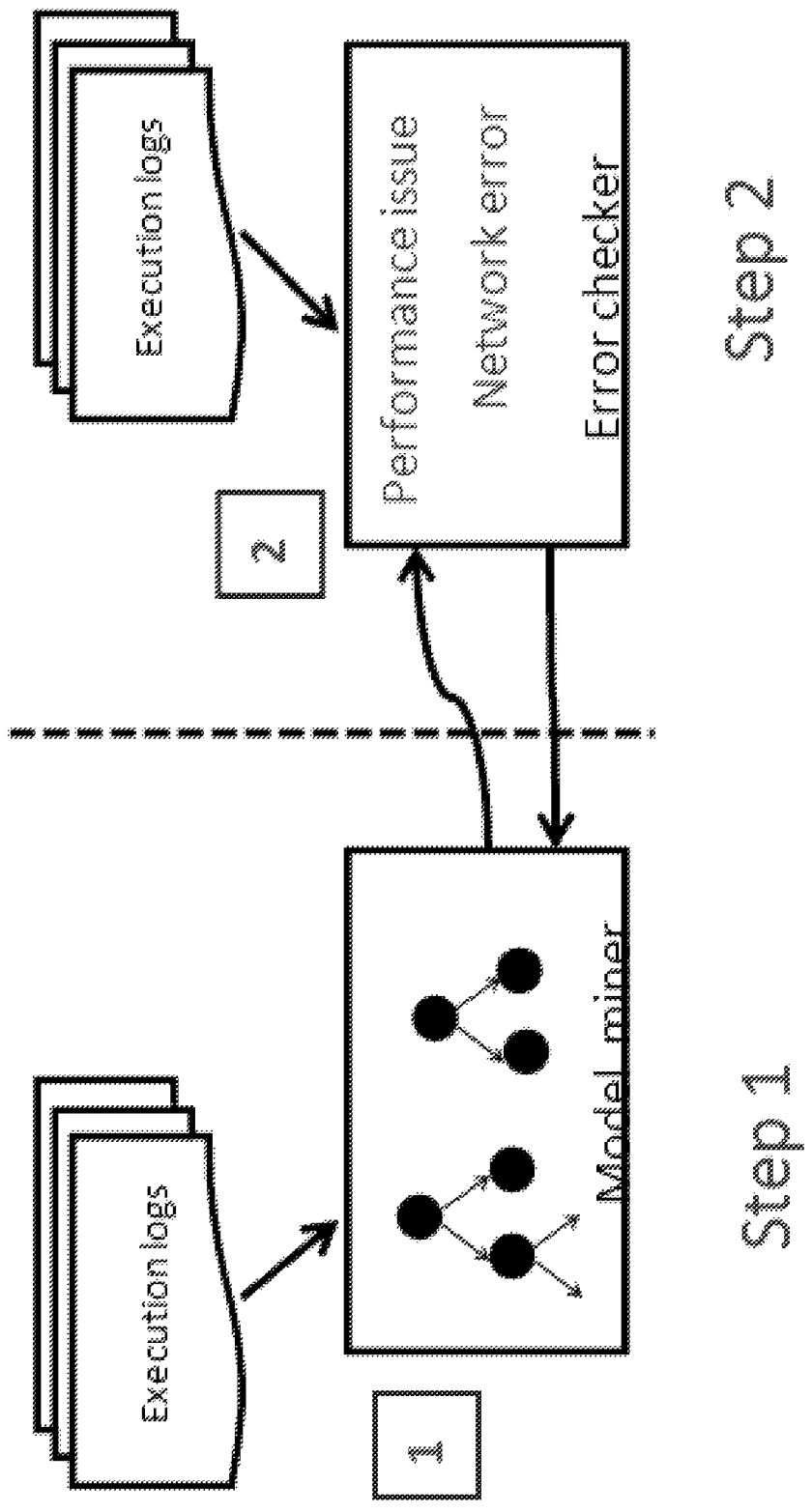
FIG. 1 shows an exemplary system for Online Error Detection for a Cloud Infrastructure.

FIG. 1 shows an exemplary implementation of an Online Error Detection for the Cloud Infrastructure called CloudSeer. The system of FIG. 1 first learns models that represent correct task (e.g. booting or stopping a VM in the cloud) executions. If the current task deviates from its model, CloudSeer flags that as an error. The model is an automaton depicting temporal dependencies between log messages for a task. It can help detect subtle errors like performance degradation (e.g., the time between two log messages is much more than expected), and also provide context for an error (e.g., provide the sequence of log messages for the task where the error happened). The model for a task is mined from the log message sequences observed for multiple executions of the task (Box 1 above). Given a set of log message sequences, CloudSeer mines temporal orders that hold for all of the sequences, e.g., log message A always appears before log message B. It also finds the average time taken between messages in the mined temporal orders, e.g. the average time between messages A and B in the given set of sequences. It then builds an automaton to record the temporal orders and time intervals between messages.

Next, CloudSeer uses the learnt automata for different tasks to check if the log message sequences for the currently executing tasks are per their respective automata (Box 2 above). CloudSeer can check for errors on-the-fly as the log messages for the tasks get generated. It does not need to wait until the completion of a task to check for errors. Since multiple tasks execute concurrently in the cloud infrastructure, the log messages from those tasks are interleaved. CloudSeeruses effective heuristics to leverage identifiers (e.g. IPs, VM IDs, Request IDs, URLs, etc.) in messages to associate messages with tasks. Thus, a log message is checked only against the model(s) of the particular task(s) it potentially can belong to. This greatly cuts down on the time and overhead of checking against infeasible task interleavings. CloudSeer can find subtle errors like performance degradation, and also provide more execution context (e.g.

how far along a task had progressed according to its automaton) for an error that can help in understanding and fixing the error.

In short, a lightweight non-intrusive monitoring tool is disclosed that leverages logs generated by cloud infrastructural services. The information in logs (e.g., error messages, irregular sequence of messages, etc.) can help discover subtle errors. Cloud administrators can use logs to diagnose errors (e.g., crashed virtual machines (VMs)). But, the enormous quantity of logs that are generated and the interleaving of log messages from multiple tasks, processes, and threads make it challenging to understand system execution, and detect and diagnose errors. These challenges are alleviated by automatically correlating log messages from the same task, and by checking if the sequence of log messages for a task is as expected or not. The system reports potential errors and performance degradation (irregularities in log message sequences) in real-time so that administrators can intervene immediately and take appropriate actions.

CloudSeer first learns automata for correct task executions. To build an automaton, it firsts runs the task (e.g. 'nova boot' to boot a new VM in OpenStack) multiple times (e.g. 200 times) and collects logs generated by all processes (e.g. nova-scheduler, nova-compute, etc. in OpenStack) involved in the task. It then finds temporal orders between log messages that hold in log sequences observed in all of the runs, and encodes them as an automaton. Before finding temporal orders, CloudSeer finds log messages that might be noise (e.g. log messages generated by periodic background processes that are not specific to the task under consideration) [Box 1.1].

A log message (skeleton) that does not appear in all of the runs is considered to be noise. CloudSeer scans through the log message sequences from all runs, and deletes the messages that do not occur in any other run. The skeleton of a log message is what remains after the dynamic content (e.g. IPs, request IDs, etc.) of the message has been removed.

After filtering out noise, CloudSeer computes temporal orders between messages if present [Box 1.2]. For example, consider the following two log messages that are seen during the execution of 'nova boot':

L1: 2014-07-31 17:30:27.409 15835 INFO nova.osapi_compute.wsgi.server [-] (15835) accepted ('172.16.5.24', 60082) CTRL /var/log/nova/nova-api.log L2: 2014-07-31 17:30:31.222 5152 AUDIT nova.compute.manager [req-0847d7a7-caa6-429d-98d8-805335bf6833 d3b739bbd45747d4a36bf2340368338f a3e2a2da40744f68ae3a297adecce55f] [instance: 6a2877ac-065d-494b-854b-9327270783ef] Starting instance . . . 172.16.4.121 /var/log/nova/nova-compute.log If we take dynamic content (e.g. time, request IDs, etc.) off the log messages, we can find the skeletons of the log messages that look as follows:

S1: <date><time><int> INFO nova.osapi_compute.wsgi.server [-] (<int>) accepted ('<ipv4>', <int>) CTRL /var/log/nova/nova-api.log S2: <date><time><int> AUDIT nova.compute.manager [req-<id><id><id>] [instance: <id>] Starting instance . . . <ipv4>/var/log/nova/nova-compute.log We denote date by <date>, time by <time>, an integer by <int>, an IPv4 address by <ipv4>, and an arbitrary string by <id>. We take the dynamic content off since that content in a message can vary from run to run. CloudSeer finds that there is a temporal order between log messages having the above two skeletons (S1 and S2), with the first one always appearing before the second. Thus, it infers a temporal dependency between S1 and S2. CloudSeer scans through log message sequences from all runs to find all possible temporal dependencies. Also, for each temporal order, S1 then S2, CloudSeer also computes the average time between S1 and S2 in given log sequences. This helps in finding performance degradation in tasks during execution.

Figure 3:
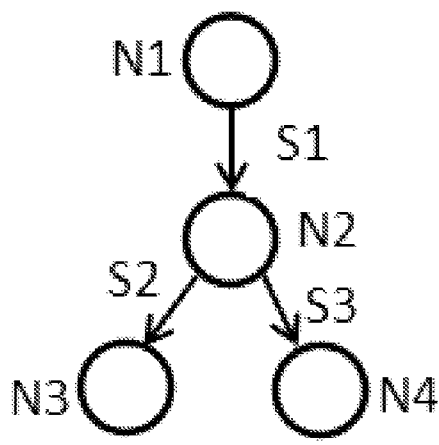
FIGS. 3-4 are exemplary automatons generated by the system of FIG. 1.

Once the temporal orders have been found, CloudSeer encodes them in the form of an automaton [Box 1.3]. For example, if it is found that S1 and S2 have a temporal order with S1 occurring before S2, and S1 and S3 have a temporal order with S1 occurring before S3, then CloudSeer would generate the following automaton of FIG. 3.

The transitions in the automaton are triggered when log messages with the corresponding skeletons are observed. When a node has multiple outgoing edges, the automaton can transition multiple times from that state. All of the states should be visited for a sequence to be deemed valid. For example, consider a sequence {S1, S2, S3}. The automaton is initially in the start state N1. When S1 is observed, it transitions to state N2. Then, when S2 is observed, it transitions to N3. But, since there are two outgoing edges from N2, the automaton can transition twice from N2. Thus, the current set of states for the automaton includes both N3 and N2. When S3 is observed, the automaton checks if it can make a transition from any of its current states. It can indeed make a transition from N2 to N4. Thus, after the sequence is completely processed, all of the states have been visited. Thus, the sequence is considered correct. On the other hand, consider sequence S2 S1. When S2 is observed, the automaton cannot make any transition from its start state N1. Thus, the sequence is not accepted and deemed anomalous.

Figure 4:
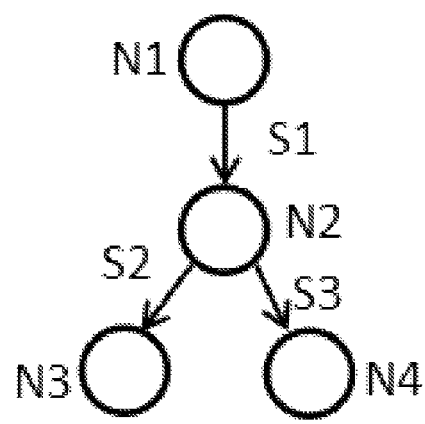
Figure 4:
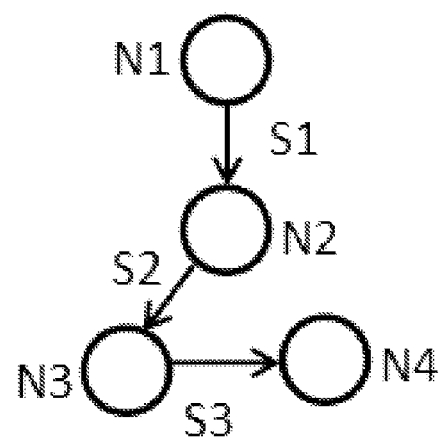

After automata have been generated for correct executions of different tasks, CloudSeer uses those automata to check for errors in currently executing tasks. Since the log messages from concurrently executing tasks can be interleaved, CloudSeer needs to determine which task an observed log message can potentially belong to [Box 2.1]. Then, the message can be checked against the automata for only those potential tasks. For example, consider the previous automaton (replicated below) for Task 1 and another automaton for a different task, Task2, and the message sequence, {S1(IP) S3(ID1) S1(IP) S2(ID1) S2(ID2) S3(ID2)}. The result is the automaton of FIG. 4 for Tasks 1 and 2.

In the message sequence, we denote dynamic content of the messages within braces. For example, S1(IP) means a log message with skeleton S1 and the dynamic content as IP. If we do not use identifiers (dynamic content) in the messages, then below is the list of automata states we would have to keep track of when checking the given sequence. Besides each instance of task automaton, we list the set of its current states. For example, when S1 is observed, it implies the starting of either task (Task 1 or Task 2). Thus, we create an instance of task automaton for Task 1 that is in state N2 and also an instance of task automaton for Task 2 in state N2. After S3 is observed, Task 2 cannot make a transition. Thus, only the automaton for Task 1 is advanced. Then we observe S1, and the current instance of Task 1 cannot advance. Thus, we create new instances of Task 1 and Task 2 in states N2. We similarly proceed for the rest of the sequence.

a) Task1 {N2} OR Task2 {N2}
b) Task1 {N2, N4}
c) Task1 {N2, N4} AND (Task1 {N2} OR Task2 {N2})
d) (Task1 {N3, N4} AND (Task1 {N2} OR Task2 {N2}))
    OR (Task1 {N2, N4} AND (Task1 {N2, N3} OR Task2 {N3}))

e) (Task1 {N3, N4} AND (Task1 {N2, N3} OR Task2 {N3})) OR (Task1 {N3, N4} AND (Task1 {N2, N3} OR Task2 {N3}))

f) (Task1 {N3, N4} AND (Task1 {N3, N4} OR Task2 {N4})) OR (Task1 {N3, N4} AND (Task1 {N3, N4} OR Task2 {N4}))

If we associate a log message with an identifier ID to a task that has ID in one of its previous messages, then we can reduce the number of automata states that we would have to keep track of.

1. Task1 {N2}{IP} OR Task2 {N2}{IP}
2. Task1 {N2, N4} {IP, ID1}
3. Task1 {N2, N4}{IP, ID1} AND (Task1 {N2}{IP} OR Task2 {N2}{IP})
4. Task1 {N3, N4}{IP, ID1} AND (Task1 {N2}{IP} OR Task2 {N2}{IP})
5. Task1 {N3,N4}{IP,ID1} AND (Task1 {N2,N3}{IP, ID2} OR Task2 {N3}{IP,ID2})
6. Task1 {N3,N4}{IP1,ID1} AND (Task1 {N3,N4}{IP, ID2} OR Task2 {N4}{IP,ID2})

Note here that when we observe S2(ID1) we use the fact that it has an identifier ID1 that matches that of an identifier in log messages that have previously matched against task instance Task 1. Thus, in step 4), we match S2(ID1) only against Task1 {N3, N4}{IP, ID1} and do not match it against Task1 {N2}{IP} or Task2 {N2}{IP} unlike in d).

After we use identifiers to associate log messages with task automata, CloudSeer checks [Box 2.2] if a given log message sequence (messages from potentially multiple concurrently executing tasks) is correct or not. CloudSeer checks a sequence against automata as described above. At any step during checking, if all of the automata involved diverge, then an error is flagged. The states of all automata and the previous messages that had matched against each automaton are provided as execution context to the administrator to help in understanding and fixing the error.

Figure 2:
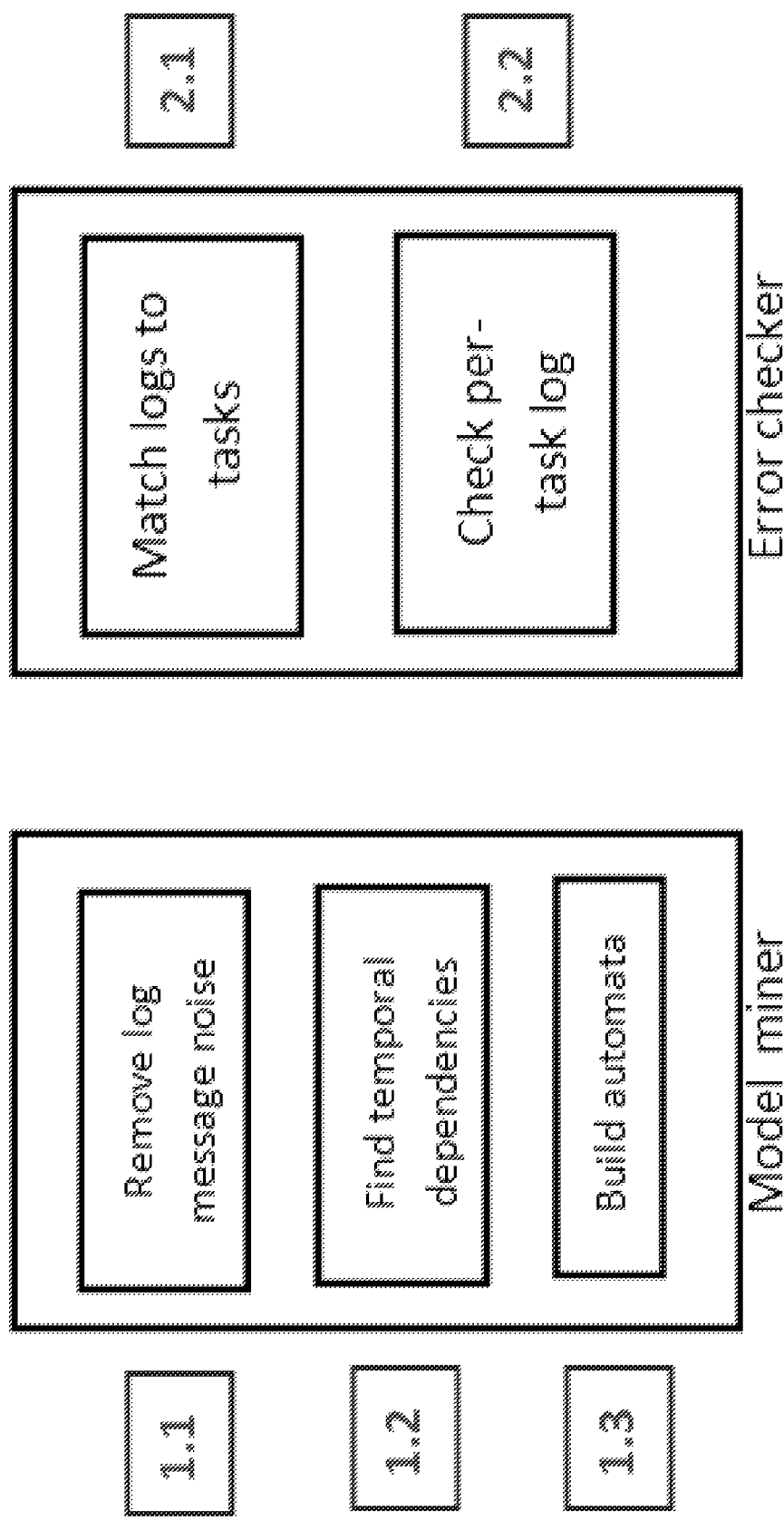
FIG. 2 shows an exemplary process for Online Error Detection for the Cloud Infrastructure.

In [Box 2.1] in FIG. 2, we use identifiers in log messages to correlate messages from the same task and does not rely on or require that the messages have unique identifiers. For example, with the OpenStack cloud platform, messages do not always have unique identifiers. Sometimes they have multiple non-unique identifiers the combination of which is unique and sometimes they do not have any unique identifier or unique combination of identifiers. CloudSeer uses effective heuristics to leverage identifiers in a log message to associate the message to potential task(s) that it can belong to. The system can consider combinations of multiple non-unique identifiers, and also tolerate the absence of any unique identifier or set of identifiers in a message.

In [Box 2.2] of FIG. 2, as we get a stream of messages, for each message, using 2.1, we compute which task instances the message can belong to. We update the automata for those instances appropriately for the incoming message. If the automata for all the task instances for this message diverge, then we flag the message as an erroneous message. Thus, we can detect errors in an online manner as they occur. This is different from previous work that needs to wait until the execution of a task has finished and the log messages for the entire task have been collected. Detecting errors as they occur can help cloud administrators to fix them in a timely manner, and thus reduce the damage that can be caused by the error.

Figure 5:
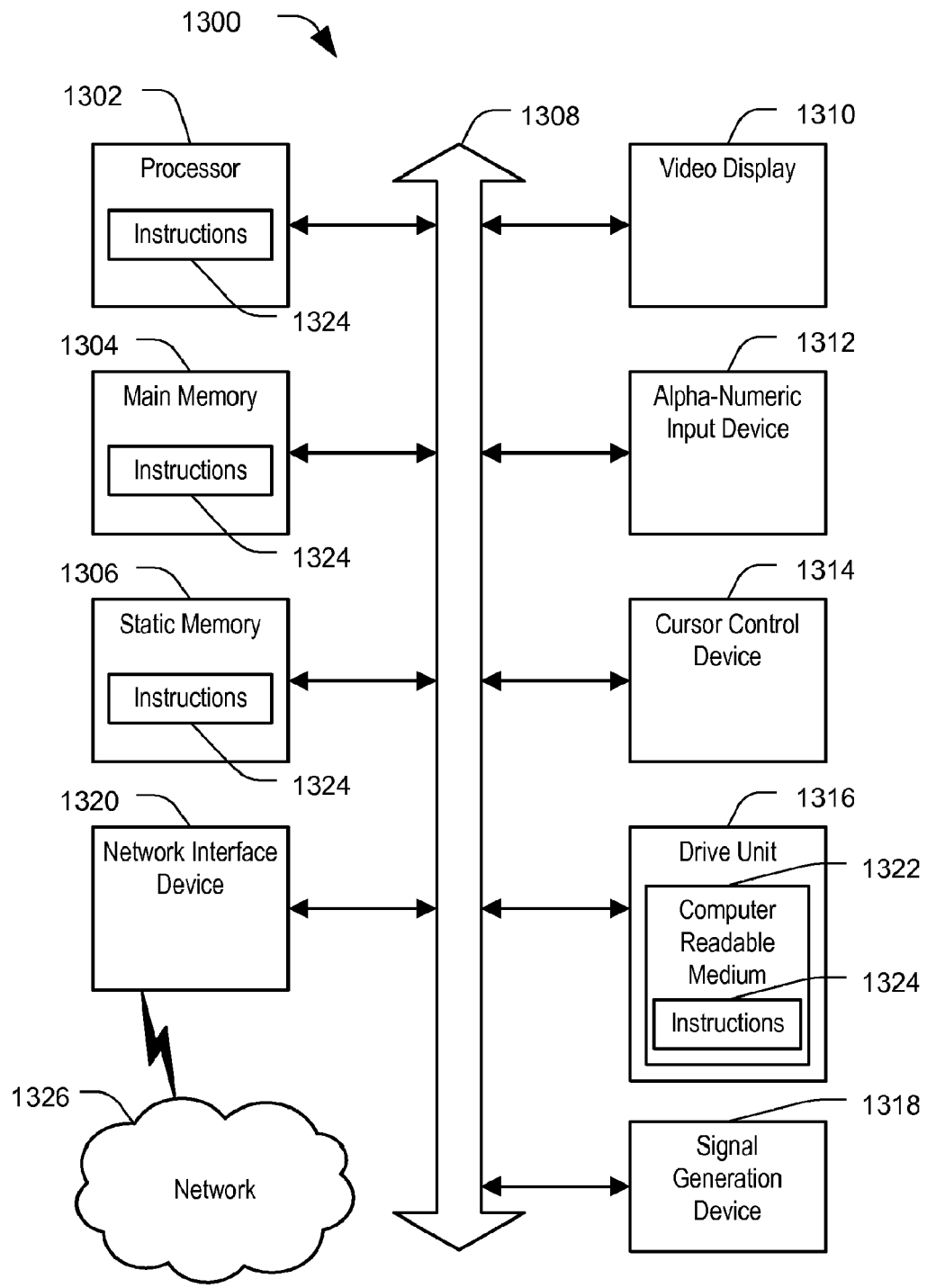
FIG. 5 shows an exemplary computer for Online Error Detection for the Cloud Infrastructure.

Referring to FIG. 5, an illustrative embodiment of a computer system is shown and designated 1300. The computer system 1300 can include a set of instructions that can be executed to cause the computer system 1300 to perform any one or more of the methods or computer based functions disclosed herein. The computer system 1300 may operate as a standalone device or may be connected, e.g., using a network, to other computer systems or peripheral devices. For example, the computer system 1300 or portions thereof may implement, include, or be included within any one or more of the devices, servers, and clouds illustrated in FIGS. 1-2.

In a networked deployment, the computer system 1300 may operate in the capacity of a server or as a client user computer in a server-client user network environment, or as a peer computer system in a distributed peer-to-peer or cloud-to-cloud network environment. The computer system 1300 can also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 1300 can be implemented using electronic devices that provide voice, video or data communication. Further, while a single computer system 1300 is illustrated, the term "system" shall also be taken to include any collection of systems or sub-systems that individually or jointly execute a set, or multiple sets, of instructions to perform one or more computer functions.

As illustrated in FIG. 5, the computer system 1300 may include a processor 1302, e.g., a central processing unit (CPU), a graphics processing unit (GPU), or both. Moreover, the computer system 1300 can include a main memory 1304 and a static memory 1306 that can communicate with each other via a bus 1308. As shown, the computer system 1300 may further include a video display unit 1310, such as a liquid crystal display (LCD), an organic light emitting diode (OLED), a flat panel display, or a solid state display. The video display unit 1310 may be operable to display various GUIs and GUI controls disclosed herein, such as the GUIs and GUI controls described with reference to FIGS. 3-8. Additionally, the computer system 1300 may include an input device 1312, such as a keyboard, and a cursor control device 1314, such as a mouse. Such input devices may enable interaction with various GUIs and GUI controls, such as the GUIs and GUI controls described with reference to FIGS. 3-8. The computer system 1300 can also include a disk drive unit 1316, a signal generation device 1318, such as a speaker or remote control, and a network interface device 1320.

In a particular embodiment, as depicted in FIG. 5, the disk drive unit 1316 may include a computer-readable medium 1322 in which one or more sets of instructions 1324, e.g. software, can be embedded. Further, the instructions 1324 may embody one or more of the methods or logic as described herein, such as the methods described with reference to FIGS. 9-12. In a particular embodiment, the instructions 1324 may reside completely, or at least partially, within the main memory 1304, the static memory 1306, and/or within the processor 1302 during execution by the computer system 1300. The main memory 1304 and the processor 1302 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium that includes instructions 1324 so that a device connected to a network 1326 can communicate voice, video or data over the network 1326. Further, the instructions 1324 may be transmitted or received over the network 1326 via the network interface device 1320.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any non-transitory medium that is capable of storing or encoding a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device. Accordingly, the disclosure is considered to include any one or more of a computer-readable medium and other equivalents and successor media, in which data or instructions may be stored.

Although the present specification describes components and functions that may be implemented in particular embodiments with reference to particular standards and protocols, the disclosed embodiments are not limited to such standards and protocols. For example, standards for Internet and other packet switched network transmission (e.g., TCP/IP, UDP/IP, HTML, HTTP, etc.) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be reduced. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above-disclosed subject matter is to be considered illustrative, and not restrictive, and the appended claims are intended to cover all such modifications, enhancements, and other embodiments, which fall within the scope of the disclosure. Thus, to the maximum extent allowed by law, the scope of the disclosure is to be determined by the broadest permissible interpretation of the following claims and their equivalents, and shall not be restricted or limited by the foregoing detailed description.

What is claimed is:

1. A method for detecting error in a cloud infrastructure, comprising:
    running a plurality of training tasks on the cloud infrastructure and generating training execution logs;
    generating a model miner with the training execution logs to represent one or more correct task executions in the cloud infrastructure;
    after training, running a plurality of tasks on the cloud infrastructure and capturing live execution logs; and
    from the live execution logs, if a current task deviates from the correct task execution, indicating an execution error for correction in real-time.

2. The method of claim 1, comprising generating an automaton depicting temporal dependencies between log messages for a task.

3. The method of claim 1, comprising detecting error including performance degradation.

4. The method of claim 3, comprising detecting unexpected time variation between two log messages.

5. The method of claim 1, comprising providing a context for an error.

6. The method of claim 5, comprising providing a sequence of log messages for the task where the error happened.

7. The method of claim 1, wherein the model for a task is mined from log message sequences observed for multiple executions of the task.

8. The method of claim 1, comprising mining temporal orders that hold for a set of log message sequences.

9. The method of claim 1, comprising building an automaton to record the temporal orders and time intervals between messages.

10. The method of claim 2, comprising training the automaton for different tasks to check if the log message sequences for the currently executing tasks are per their respective automata.

11. The method of claim 1, comprising checking for errors on-the-fly as log messages for the tasks get generated.

12. The method of claim 11, comprising monitoring multiple tasks executed concurrently in the cloud infrastructure, and interleaving log messages from the tasks.

13. The method of claim 11, comprising applying one or more identifiers in messages to associate messages with tasks.

14. The method of claim 13, wherein the identifier includes one of: internet protocol (IP) address, virtual machine identifier, request identifier, Uniform Resource Locator (URL).

15. The method of claim 11, comprising checking a log message against only model(s) of predetermined task(s) associated with the log message.

16. The method of claim 11, comprising providing execution context for an error for understanding and fixing the error.

17. The method of claim 16, comprising determining a progression of a task according to a task automaton.

18. A system for detecting error in a cloud infrastructure, comprising:
   a cloud infrastructure including a processor, a data storage device, and one or more resources;
   a logger coupled to the cloud infrastructure for running a plurality of training tasks on the cloud infrastructure and generating training execution logs, and subsequent to training, the logger running a plurality of tasks on the cloud infrastructure and capturing live execution logs;
   a model miner coupled to the logger and trained by the training execution logs to represent one or more correct task executions in the cloud infrastructure;
   an error checker coupled to the model miner and to the logger to receive live execution logs, and if a current task deviates from the correct task execution, the error checker indicating an execution error for correction in real-time.

* * * * *